United States Patent [19]

Harris

[11] 3,912,998
[45] Oct. 14, 1975

[54] BATTERY CHARGING, STORING AND DISPENSING DEVICE

[76] Inventor: Vernon C. Harris, Rte. 1, Heyworth, Ill. 61745

[22] Filed: Sept. 16, 1974

[21] Appl. No.: 506,413

[52] U.S. Cl. .................................. 320/2; 206/333
[51] Int. Cl.² ...................... H02J 7/00; B65D 73/02
[58] Field of Search ............................ 320/2–5, 48, 320/15; 221/292; 206/333

[56] References Cited
UNITED STATES PATENTS

| | | | |
|---|---|---|---|
| 2,129,897 | 9/1938 | Williams | 221/292 |
| 3,297,933 | 1/1967 | McCarthy | 320/2 |
| 3,344,334 | 9/1967 | Rubin | 320/2 |
| 3,414,793 | 12/1968 | Jasperson | 320/15 X |
| 3,484,659 | 12/1969 | Nagai et al. | 320/2 X |
| 3,625,396 | 12/1971 | Phipps | 206/333 X |

FOREIGN PATENTS OR APPLICATIONS 620,463 3/1949 United Kingdom .................. 320/48

Primary Examiner—J. D. Miller
Assistant Examiner—Robert J. Hickey
Attorney, Agent, or Firm—Henderson & Strom

[57] ABSTRACT

A battery charging and storing device having a source of power electrically connected with a parallel combination of hearing aid or other smaller batteries. Two sheets of conductive material in the connection are separated by a sheet of non-conductive material. The non-conductive material has a plurality of slots therein for encompassing batteries to be charged or stored. A leaf spring structure on one of the sheets of conductive material contacts one of the poles of a battery to be charged or stored and holds the other pole of the battery firmly against a portion of the other conductive sheet. A separate spring biased plunger is associated with each slot and is disposed adjacent thereto through an opening in the non-conductive layer of material. These plungers may be moved to a position to easily eject from a slot a battery being stored or charged in such slot.

8 Claims, 8 Drawing Figures

U.S. Patent    Oct. 14, 1975    3,912,998
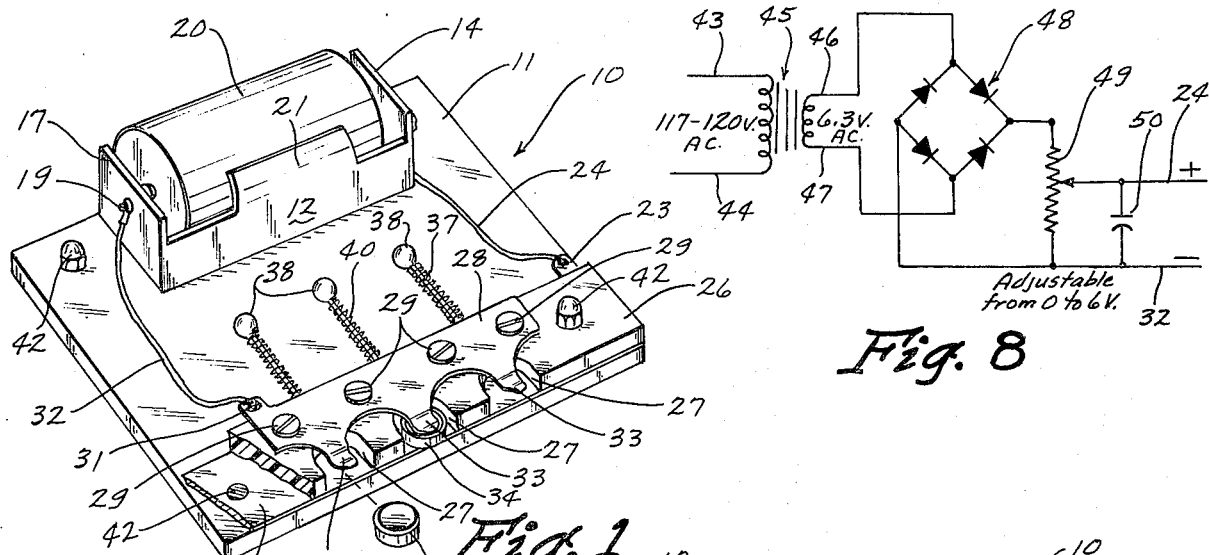
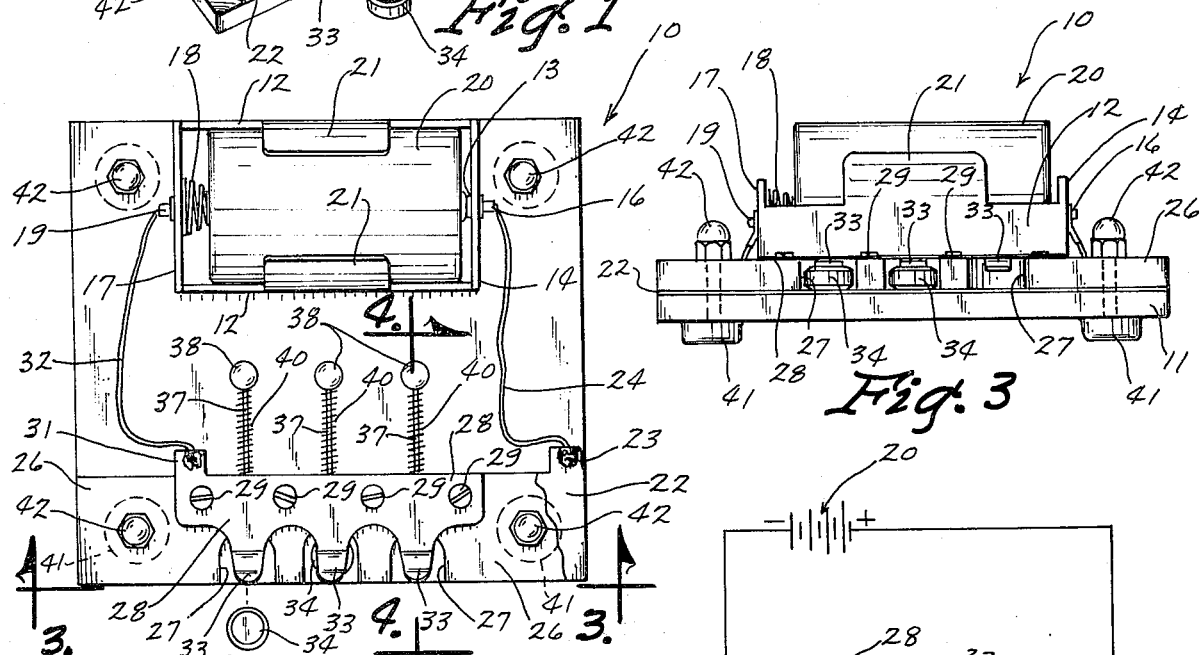
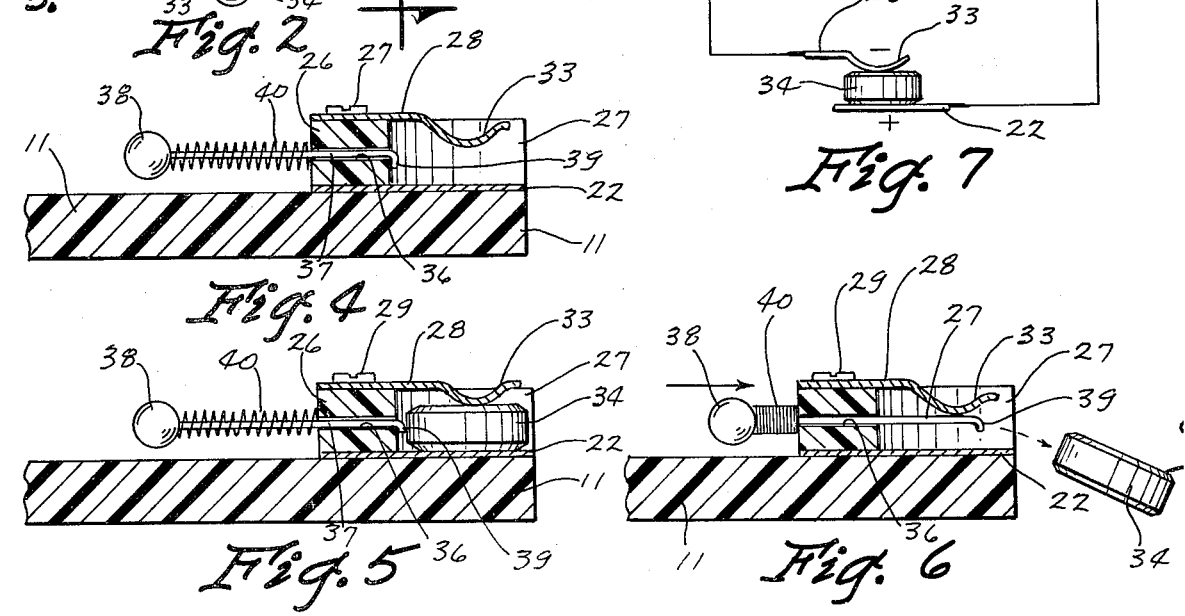

BATTERY CHARGING, STORING AND DISPENSING DEVICE

BACKGROUND OF THE INVENTION

The present invention relates generally to a battery charging and storing device and more particularly to a battery charging and storing device for batteries of the disc or button type such as those used as power sources for hearing aids, cameras and other electronic devices.

Batteries of the disc or button type such as used in such devices as hearing aids and cameras are normally quite expensive and usually have a relatively short life. It has been the usual practice to discard these batteries or energy sources when their energy has been expended. It has been found, however, that these batteries can be recharged several times, thereby representing a considerable savings to the battery user. Because of this need to recharge small batteries when they have run down, various types of chargers have been developed to accomplish this purpose. U.S. Pat. No. 3,414,793 shows the general principle of using a large battery to charge a single small battery. U.S. Pat. No. 3,297,932 illustrates the type of battery charging device wherein a plurality of small button or disc type batteries are recharged from a single charging source. Still another charger using a main power source in series with the plurality of parallel batteries to be charged is shown in U.S. Pat. No. 3,579,075.

While it is true that many different kinds of battery chargers are available, there still exists a need for a battery charger which is simple and economical, and yet which receives and dispenses batteries with ease. Because of the very small size of the batteries in hearing aids and the like, these batteries are very difficult to handle. It is sometimes very difficult to be able to place a battery to be charged or stored in the proper place for this purpose because of its small size. This is true because the battery must be placed in a position to be in electrical contact with the charging or maintaining circuit, and once in position, the device must firmly hold the battery in electrical contact. Because of the need to hold the battery in tight electrical contact, it is often times difficult to subsequently remove the battery for use.

Many attempts have been made to solve the problem of how to dispense and handle batteries in chargers and in other devices. For example U.S. Pat. No. 3,171,568 illustrates a device for recharging flashlight batteries by placing them in a column to be dispensed one at a time. U.S. Pat. No. 3,210,483 also recognizes the problem of handling small hearing aid batteries, and illustrates a structure for removing such a battery from a hearing aid device. U.S. Pat. No. 3,753,095 is also illustrative of an instance wherein the problem of handling small hearing aid batteries has been recognized.

In addition to the problem of recharging a battery which has lost a substantial amount of its energy through use in an electronic device such as a hearing aid or camera, is the problem of storing a new or fully charged battery such that it does not lose any of its energy prior to use. Because of the desirability to have an extra battery on hand in case the battery in an electronic device has expired at a crucial time, it is often necessary to buy extra batteries and keep them for such purposes. There has heretofore been no device for easily facilitating the storage of such batteries to prevent them from loosing their energy before actual use.

SUMMARY OF THE INVENTION

The present invention relates to a device for storing or charging a battery or a plurality of batteries, wherein battery compartments for batteries to be charged or stored are connected in parallel. The parallel connection is, in turn, connected electrically in parallel with a source of substantially constant voltage. A metal leaf spring structure holds each individual battery to be charged in a slot in electrical contact with the parallel connection. An insulating member separates the conducting portions of the parallel connection, and slots therein serve as spacer compartments. A spring biased plunger through the insulating member allows the batteries which are being charged or stored to be easily removed.

An object of the present invention is to provide a device for charging small batteries such as the disc or button type used in electronic devices such as hearing aids and cameras.

Another object of the invention is to provide a device for storing batteries to prevent them from prematurely discharging or being misplaced.

A further object of the invention is to provide a structure for easily dispensing small batteries when they are needed.

Still another object is to provide a structure which holds batteries in firm electrical contact within a charging circuit, but which allows the batteries to nevertheless be easily removable.

A still further object of the invention is to provide an economical and practical single unit to charge, store and dispense batteries.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the battery charging, storing and dispensing device of the instant invention;

FIG. 2 is a top plan view of the preferred embodiment of the present invention;

FIG. 3 is a front view taken along line 3—3 of FIG. 2;

FIG. 4 is a cross-sectional view taken along line 4—4 of FIG. 2;

FIG. 5 is a view similar to FIG. 4, but with a battery shown in charging or storing position;

FIG. 6 is a view similar to FIG. 4, but with the plunger in a forward position to eject a battery being stored or charged;

FIG. 7 is a schematic view showing the connection of the battery to be charged or stored in series with the power source; and FIG. 8 is a circuit diagram of a modified form of power supply for the instant invention.

DESCRIPTION OF THE PREFERRED EMBODIMENT

Referring now to the drawings wherein like reference numerals designate like or corresponding parts throughout the several views, FIG. 1 shows a perspective view of the charging, storing and dispensing device 10 of the instant invention. An insulating base 11 is formed of a non-conducting material and serves as a housing for mounting all of the components of the invention thereto. A main battery holder or compartment 12 is attached to the base 11 and is also made of a non-conducting material. An electrical contact 13 extends through the wall 14 of the battery compartment 12 and attaches to an electrical connection 16 on the outside of compartment 12. On the opposite wall 17 of the battery compartment 12 is disposed a coil spring like member 18 which is in electrical contact with the connection 19 on the opposite side of wall 17 (FIG. 2). A battery 20 is received in the battery compartment 12 with the positive end thereof in contact with the contact 13 of compartment 12, and the negative end in contact with spring like member 18 on the other end of the battery compartment 12. Upwardly and inwardly extending projections 21 on the battery compartment 12 are flexible enough to allow the battery 20 to pass into and out of the battery compartment 12, but are yet sufficiently rigid enough to hold the battery 20 in the battery compartment 12. The spring like member 18 in compartment 12 assures a good electrical contact between the battery contacts and the battery compartment contacts 13 and 18.

Also mounted on the base 11 is a brass plate 22 which has an extension 23 on one end thereof (FIG. 2). A conducting wire 24 connects the extension 23 of the brass plate 22 to the positive electrical connection 16 on the main battery compartment 12 such as by a soldered joint. Lying just above the conducting plate 22 is a non-conducting plastic sheet of material 26. Upon one edge of the non-conducting layer 26 of material is formed a plurality of notches or slots 27. A second brass plate 28 is positioned on the top of the non-conducting layer 26 and is fastened thereto by screws or bolts 29. These screws or bolts 29 do not, however, come into contact with the first brass plate 22. Ordinarily, a notch (not shown) is formed in plate 22 below the screws or bolts 29 to prevent electrical contact between the plate 22 and the screws or bolts 29. An extension 31 on one end of the second brass plate 28 is connected by a joint to an insulated conducting wire 32, which is, in turn, connected to the negative electrical contact 19 on the battery compartment 12. These connecting joints are preferably made by soldering, but other types of connections are acceptable.

Extending portions 33 of the second brass plate 28 extend over the middle of the notches 27 in non-conducting member 26. These extensions 33 are of a leaf spring type of configuration and extend downwardly into the slot 27, as best shown in FIG. 4. The distance between the bottom of the contact 33 and the top of the brass plate 22 is less than the thickness of the battery to be charged.

It can be best seen in FIG. 5 that when a battery 34 is pushed into the slot 27, the contacting portion 33 of second brass plate 26 is forced upwardly but yet exerts a downward force upon the battery 34 and keeps the battery in intimate contact with the extension 33 and with a portion of plate 22. This contact consequently forms a parallel circuit between the battery 34 and the battery 20 as can be best seen in FIG. 7. Additionally, the batteries 34 in the slots 27 are connected in parallel to thereby apply a constant voltage to each of the batteries 34. Typically the battery compartment 12 is sized to hold one, two or three size D, 1.5 volt batteries, and the slots 27 are sized to hold 1.4, 2.8, or 4.2 volt batteries respectively. Alternatively the battery compartment 12 may be replaced by a transformer, preferably of an adjustable type as shown in FIG. 8.

The components of the circuit diagram shown in FIG. 8 are preferably placed in a small box, not shown, which would replace the battery compartment 12 and the battery 20 as an alternate form of the invention. Connections 43 and 44 of transformer 45 are connected to a normal house AC current having about 120 volts potential difference at 60 Hz. The output sides 46 and 47 of the transformer 45 have a potential difference of 6.3 volts, AC, in one embodiment of the invention. A 50 volt, one amp full bridge rectifier 48 is connected in the circuit as clearly shown in FIG. 8. The DC output from the rectifier 48 is connected to a voltage divider 49 which is adjustable to vary the voltage therefrom from 0 to 6 volts DC. Connected in parallel to the output from the voltage divider 49 is a 100 micro-farad, 15 WV capacitor 50. The output lines 24 and 32 from this source of power depicted in FIG. 8 connect to contacts 23 and 31, respectively in the same manner as in the embodiment of FIGS. 1– 7.

Each of the slots 27 formed in the non-conducting layer 26 has an opening 36 leading thereto through the non-conducting layer 26 (FIGS. 4–6). Extending through the opening 36 is a rod 37. Upon one end of the rod is disposed an enlarged ball shaped portion 38, and on the other end of the rod 37 is a bent over portion 39. A coil spring 40 is positioned around the plunger 37 and is in contact at one end thereof with the non-conducting layer 26, and at the other end with the enlarged portion 38 of the plunger 37. This spring 40 serves to bias the plunger 37 to the left as shown in FIGS. 4–6.

When it is desired to remove a battery 34 from a slot 27, the plunger 37 is moved to the position shown in FIG. 6 by manually or otherwise pushing the enlarged portion 38 of the plunger 37 to the right and thereby compressing the coil spring 40. Consequently, the bent-over end 39 of the plunger 37 forces the battery 34 out of the slot 27. When the plunger is released, the spring 40 moves the plunger back to the position shown in FIGS. 1, 2, 4 and 5. The bent-over portion 39 prevents the plunger 37 from being pulled out of the opening 36 by the action of the spring 40.

Rubber leg members 41 (FIG. 3) are fastened on each corner of the device by bolts and nut members 42, however, it will be understood that many other types of mountings and housings are possible in keeping within the spirit and scope of the present invention.

Obviously many modifications and variations of the present invention are possible in light of the above teachings. For example, the battery compartment 12 may be of the type to accept a plurality of batteries in order to obtain the proper voltage to be applied to the batteries in the slots 27. Also, the size of slots 27 may vary, depending upon the size of the batteries to be charged or stored. Additionally other transformer circuits may be used as a power source besides the circuit disclosed herein. It is therefore to be understood that, within the scope of the appended claims, the invention may be practiced otherwise than as specifically described.

I claim:

1. A battery charging and storing apparatus comprising:

a housing of a non-conductive material;

a source of electrical power connected to said housing;

a first sheet of conductive material disposed on said housing;

a layer of non-conductive material disposed on said first sheet of conductive material;

a second sheet of conductive material disposed on said layer of non-conductive material whereby the layer of non-conductive material is disposed between the first and second sheets of conductive material;

a slot formed in one edge of said layer of non-conductive material, the bottom thereof defined by a portion of said first sheet of conductive material and the top thereof being defined by a portion of said second sheet of conductive material, said portion of said second sheet of conductive material being of a leaf spring configuration;

means for holding a battery in said slot in contact with said portions of said first and second sheets of conductive material;

said source of electrical power being electrically connected to said first and second conductive sheets; and means for removing a battery from said slot, comprising:
 an opening in said non-conductive layer terminating at one end into the slot and terminating at the other end on an outside edge of said non-conductive layer;
 a plunger received in a sliding relationship in said opening and having means on each end thereof for preventing the plunger to pass out of said opening, said plunger having a first position substantially outside of said slot and a second position extending substantially into said slot; and
 means for biasing said plunger to said first position.

2. A battery charging and storing apparatus as defined in claim 1 wherein a second notch is formed in said one edge of said layer of conductive material, the bottom thereof being defined by a second portion of said first sheet of conductive material and the top thereof being defined by a second portion of said second sheet of conductive material, said second portion of said second sheet of conductive material being of a leaf spring configuration;

second means for holding a battery in said second slot in contact with said second portions of said first and second sheets of conductive material whereby batteries in said first and second slots are thereby connected in parallel;

means for removing a battery from said second slot comprising a second opening in said non-conductive layer terminating at one end thereof into the second slot and at the other end thereof to the outside edge of said non-conductive layer, a second plunger received in sliding relationship in said opening and having second means on each end thereof for preventing the plunger to pass out of said opening, said second plunger having a first position substantially outside of said second slot and a second position extending substantially into said second slot; and second means for biasing said second plunger to said first position of said second plunger.

3. A battery charging and storing apparatus as defined in claim 2 wherein said source of electrical power includes a battery compartment.

4. A battery charging and storing apparatus as defined in claim 3 wherein said battery compartment is of a size to hold one 1.5 volt, size D battery and said slots are of a size to hold 1.4 volt hearing aid batteries.

5. A battery charging and storing apparatus as defined in claim 3 wherein said battery compartment is of a size to hold two 1.5 volt, size D batteries and said slots are of a size to hold 2.8 volt hearing aid batteries.

6. A battery charging and storing apparatus as defined in claim 3 wherein said battery compartment is of a size to hold three 1.5 volt, size D batteries and said slots are of a size to hold 4.2 volt hearing aid batteries.

7. A battery charging and storing apparatus as defined in claim 2 wherein said source of electrical power includes a step-down transformer attached to said housing.

8. A battery charging and storing apparatus as defined in claim 7 wherein said electrical source includes means for changing current from alternating to direct current; and
 means for adjusting the voltage output of the electrical source which is applied to said first and second conductive sheets.

* * * * *